(12) United States Patent
Allen et al.

(10) Patent No.: US 6,238,096 B1
(45) Date of Patent: *May 29, 2001

(54) PRESS-ALIGNABLE BEARING ASSEMBLY

(75) Inventors: Peter F. Allen, Alpharetta; Bryan T. Thompson, Peachtree City, both of GA (US)

(73) Assignee: Spyraflo, Inc., Peachtree City, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/326,089

(22) Filed: Jun. 4, 1999

Related U.S. Application Data

(63) Continuation-in-part of application No. 08/968,929, filed on Nov. 12, 1997, now Pat. No. 5,911,515.

(51) Int. Cl.$^7$ .............................. F16C 23/04; F16C 43/04
(52) U.S. Cl. ...................... 384/495; 384/537; 384/558; 384/585
(58) Field of Search ........................... 384/495, 498, 384/535, 537, 539, 558, 584, 585, 192, 206–210, 275, 295, 296, 428, 438, 439, 441

(56) References Cited

U.S. PATENT DOCUMENTS

| | | | |
|---|---|---|---|
| 2,865,688 | * 12/1958 | Lemont, Jr. | 384/558 |
| 3,240,502 | * 3/1966 | Snyder | 384/192 X |
| 3,252,742 | 5/1966 | Swanstrom | 384/206 |
| 3,317,256 | 5/1967 | Ernest | 384/410 |
| 3,372,960 | * 3/1968 | Fisher | 384/439 |
| 3,796,471 | * 3/1974 | Holm | 384/558 |
| 4,353,615 | * 10/1982 | Kramer et al. | 384/192 X |
| 5,061,091 | * 10/1991 | Shiratori | 384/539 |
| 5,344,240 | * 9/1994 | Tatro et al. | 384/569 |
| 5,397,186 | * 3/1995 | Watanabe et al. | 384/537 X |
| 5,927,862 | * 7/1999 | Debnam et al. | 384/439 |

* cited by examiner

Primary Examiner—Thomas R. Hannon
(74) Attorney, Agent, or Firm—Womble Carlyle Sandridge & Rice

(57) ABSTRACT

A press-alignable bearing assembly comprises a generally cylindrical retainer configured to be pressed and held with an interference fit in an opening formed in a sheet of material such as metal or plastic. A bearing, such as a rolling bearing or a bushing, is mounted in the retainer for rotatably or slidably receiving a shaft when the retainer is mounted in the opening. In one embodiment, the bearing is press fit directly into the retainer and is rigidly secured by an interference fit. In another embodiment, the bearing is press fit into a bearing sleeve and the bearing sleeve is mounted in the retainer for limited rocking movement relative to the longitudinal axis of the retainer. With the later embodiment, the bearing is self-aligning with a shaft rotatably inserted therethrough. A further embodiment includes a spring clip and a retaining ring on the retainer for securing the retainer and an ancillary component to the sheet of material.

17 Claims, 4 Drawing Sheets

PRESS-ALIGNABLE BEARING ASSEMBLY

REFERENCE TO RELATED APPLICATION

This application is a continuation-in-part of U.S. patent application Ser. No. 08/968,929 filed Nov. 12, 1997 now U.S. Pat No. 5,911,515.

TECHNICAL FIELD

This invention relates generally to bearings and bushings for rotatably supporting shafts and the like. Specifically, the invention relates in one embodiment to self-clinching and self-aligning bearing assemblies adapted to be press fit into openings formed in relatively thin sheet metal or plastic material. In another embodiment, a press-fit non-clinching bearing assembly is adapted to be pressed into thicker walled chassis and housings and to be removable for replacement, if necessary

BACKGROUND OF THE INVENTION

Bearings for rotatably supporting the ends or mid portions of drive shafts, linear motion shafts, and other types of shafts have been used for many years. Such bearings are available in a wide variety of forms for use under an equally wide variety of conditions. For example, bushings made of Teflon or other low friction plastic material are often used in situations where the shafts supported by the bearings are to be driven at relatively low rotation rates and are to bear relatively low lateral loads. To accommodate higher rotation rates and loads, bushings made of relatively soft porous metal such as bronze are often used. These types of metal bushings are advantageous over plastic bushings because they are able to bear higher lateral loads imparted by shafts and are able to accommodate higher rotation rates without overheating. In addition, porous metal bushings can be impregnated with an oil or another lubricant to reduce their coefficients of friction substantially.

In situations where even higher rotation rates and/or higher lateral loads are to be accommodated, rolling bearings such as roller bearings and ball bearings are used. Rolling bearings offer very high lateral load bearing capability and have very low frictional resistance to accommodate much higher rotation rates than static bushings.

When rotating drive shafts are used in lighter equipment such as, for example, printers, plotters, and photocopy machines, it is common to support the shafts in bearings that are mounted in facing walls of a relatively thin metal chassis. In these circumstances, the bearings must be mounted to the walls of the chassis in such a way that they are aligned with each other to receive the shaft without binding. In the past, this has been accomplished in a variety of ways. In some instances, opposing walls of the chassis are punched to form aligned holes. The bushings or bearings are then press fit into a mounting collar having mounting dogs or tabs for mounting the collar to a wall of the chassis with rivets or bolts to align the bearings with each other and with the punched holes in the chassis. While this method can work well, it nevertheless is relatively expensive because the mounting holes for the collars must be precisely positioned for properly aligning the bearings and because several machining steps are required to mount the bearings to the walls.

Self-clinching bushing assemblies have been available for securing and aligning plastic and metal bushings in opposed relatively thin sheet metal walls. U.S. Pat. No. 3,252,742 of Swanstrom discloses such a bushing assembly. The Swanstrom device includes a retainer that is adapted to be pressed into and clinch itself securely within a hole formed in a relatively thin metal sheet. The retainer has a generally cylindrical pilot that is tapered in such a way that its narrow end can be inserted into the hole and, as the retainer is pressed further into the hole, its wide end spreads or stretches the hole slightly. A radially projecting annular head is formed at the wide end of the retainer and abuts the metal sheet when the retainer is fully pressed into the hole. An annular undercut groove is formed in the pilot just beneath the head. When the retainer is fully pressed into the hole, the slightly stretched metal around the periphery of the hole contracts slightly into the annular groove to clinch the retainer securely in place and to align it perpendicular to the wall.

Swanstrom further discloses a plastic bushing disposed in the retainer. The bushing is formed with an outwardly projecting spherical bulge that rests against a tapered seat formed around the interior wall of the retainer and that is captured in the retainer by a crimping operation. In this way, the bushing is free to rock a bit relative to the central axis of the retainer but nevertheless is secured firmly therein. Accordingly, the plastic bushing can rock slightly as necessary to align itself precisely with a like bushing mounted in an opposing wall of the chassis to receive and rotatably supporting a shaft.

U.S. Pat. No. 3,317,256 of Ernest discloses a similar bushing assembly wherein a lubricant impregnated packing is disposed and sealed between the retainer and a bushing mounted therein. The bushing of Ernest is made of a somewhat porous metal and thus slowly wicks lubricant from the packing through to the interface between the bushing and the shaft to provide longer term reduced friction between the bushing and the shaft. The Ernest apparatus is an attempt to accommodate higher rotation rates of the shaft than is possible with dry or impregnated bearings while still retaining the self-clinching press fitable feature of the bearing assembly.

While bearing assemblies such as those disclosed in Swanstrom and Ernest have proven successful for economically installing plastic and metal bushings in relatively thin sheet metal walls, they nevertheless exhibit certain inherent shortcomings that limit their applicability. Most notable is the inherent limitations on rotation rates and lateral load bearing capacity provided by static plastic and metal bushings. Even with lubricant impregnation and other lubricating techniques, such bushings will overheat, deform, and seize when shafts supported in them are rotated beyond a predefined limit or are subjected to substantial lateral loads. In these situations, rolling bearings must be used. However, to date there has not been available a rolling bearing assembly that can be press fit into an opening in a thin metal sheet in such a way that the assembly is self-clinching and provides accurate alignment of a rolling bearing. This has been due in part to inaccurate chassis bending and punching techniques, which heretofore have not produced the tolerances required for rolling bearings, and in larger part to the failure of those skilled in the art to produce with success a functional rolling bearing assembly that exhibits self-clinching press fittable characteristics. Accordingly, when rolling bearings are called for, they are still mounted in the traditional, cumbersome, and expensive way by being secured in a relatively thick bearing collar that must then be accurately mounted to the metal sheet with bolts or rivets extending through mounting dogs on the collar.

In some cases, such as in more substantial or expensive machinery, walls into which bearings or bushings must be installed are not thin metal walls but rather are thicker walls, which may be made of metal but also may be made of plastic or other material. Under these conditions, the clinching of the bearing assembly into the wall is not feasible. In addition, the more expensive machinery in which thicker walls are often found may well be designed to outlast one or several sets of bearings and the bearings must be replaced. Self clinching bearing assemblies are not removable once installed without destroying the opening in which they reside. Thus, self clinching bearings have not been suitable for use with thicker walls and bearing housings bolted or riveted to the chassis have been the only viable option.

Finally, in some cases, additional components need to be fastened to a wall in the same vicinity where bushings and bearings are located. In these situations, a multi-step manufacturing process is generally required where the additional components are located and fastened to the wall with the bearings and bushings being installed independently. In some cases, the bearings actually are pressed through holes formed in the additional components and aligned with the bearing receiving holes in the chassis wall. It would be desirable to simplify the manufacturing process in these situations.

Accordingly, there exists a need for a rolling bearing assembly that offers the ease, convenience, and economy of self-clinching press fittable installation in the relatively thin metal walls of an equipment chassis while at the same time accurately aligning a rolling bearing rather than a static bushing for accommodating drive shafts that are to be rotated at high speeds or that are to bear high lateral loads. A further need exists for a press-alignable bearing assembly that is not self clinching, that is press mountable and press alignable in thicker walled chassis made of plastic and other material, and that can be removed when necessary for replacement. A need also exists for a press alignable bearing assembly that also functions as part of an integrated fastening system for fastening auxiliary components to a chassis. It is to the provision of bearing assemblies that meet these needs that the present invention is primarily directed.

SUMMARY OF THE INVENTION

Briefly described, the present invention, in one preferred embodiment thereof, comprises a self-clinching rolling bearing assembly for being pressed into and mounted within a substantially circular opening formed in a relatively thin metal sheet. The rolling bearing assembly comprises a retainer formed with a generally cylindrical body portion having an inner surface, an outer surface, a distal end, and a proximal end. The outer surface of the retainer is at least partially tapered to establish an outer diameter at its distal end that is less than the diameter of the opening formed in the metal sheet. The proximal end portion of the retainer has an outer diameter that is slightly larger than the diameter of the opening to establish an interference fit between the proximal end of the retainer and the opening as the retainer is pressed into the opening.

A rolling bearing, which can be a roller bearing, a ball bearing, a needle bearing, a linear bearing, or another type of rolling bearing, is mounted within the retainer. In one embodiment, the rolling bearing itself is press fit into a bearing sleeve that, in turn, is secured in the retainer for limited rocking movement relative to the longitudinal axis of the retainer. In this way, the bearing sleeve and its bearing can rock slightly to align itself precisely with a like bearing on an opposing wall of an equipment chassis for rotatably receiving a shaft. In another embodiment, the rolling bearing is press fit directly into the retainer and is fixed relative thereto. In this embodiment, the rolling bearing is not self-aligning but nevertheless has been found to function well with chassis formed with modern chassis bending and punching techniques, which produce chassis with more accurately aligned walls and more accurately placed punched openings.

In yet another embodiment of this invention, a press-alignable and removable bearing assembly is provided and is particularly suited for installation in thicker chassis walls made of metal, plastic, or other materials. Such walls typically are found in more expensive higher end equipment that is designed to outlast its bearings, requiring periodic bearing replacement. In this embodiment, a retainer is formed with a generally cylindrical body portion having an inner surface, an outer surface, a distal end, and a proximal end. The outer surface of the retainer is at least partially tapered to establish an outer diameter at its distal end that is less than the diameter of an opening in a wall into which the bearing assembly is to be pressed. The non-tapered portion of the outer surface at the proximal end is substantially cylindrical and is just slightly larger than the diameter of the opening. A radially projecting rim or head is formed at the proximal end of the retainer.

Unlike the prior embodiment, there is no undercut annular groove formed at the base of the head in this alternate embodiment. Instead, the retainer of this embodiment is intended to be pressed into an opening in a thicker wall where it is held firmly by an interference or friction fit between the retainer and the periphery of the opening. This embodiment is therefore suitable for use in thicker chassis walls made of material such as plastics as well as in thicker metal walls. In addition, the bearing assembly of this embodiment is easily removed for replacement when necessary simply by pressing the retainer and its bearing out of the opening and pressing a replacement bearing assembly back in the opening. This embodiment therefore provides all the advantages of a self clinching bearing assembly with the added advantage of being removable for replacement when necessary.

In yet another embodiment a press alignable bearing assembly has a retainer with a generally cylindrical body portion. The retainer is adapted to receive and secure a bearing and has an outer surface. A rim or head is provided at the proximal end of the retainer and an annular recess is formed intermediate the proximal and distal ends of the retainer. In use, the retainer of this embodiment functions both as a bearing retainer and a fastener for ancillary components. Specifically, the retainer extends and is press fit through openings in a chassis wall and in the ancillary component. The retainer is secured tightly in place with an annular spring clip that bears against the chassis wall and is held in place with an annular washer disposed in the annular recess in the retainer body.

Thus, in one embodiment of the invention, a bearing assembly is provided that offers the many advantages of a rolling bearing for high speed high load conditions while at the same time providing the ease and economy of a self-clinching device that can be installed in relatively thin sheet metal walls of a chassis. In another embodiment, the bearing assembly is not self clinching but rather press fittable and press alignable and is particularly suited for use in relatively thicker metal or plastic chassis wall, from which it can be removed and replaced as necessary.

It is another object of the invention to provide a self-clinching press fitable bearing assembly that will accommodate much higher rotation rates and lateral loads than self-clinching bushing assemblies of the past.

A further object of the invention is to provide a self-clinching rolling bearing assembly that insures proper alignment of bearings when the assembly is pressed and clinched into a sheet metal wall.

A still further object of the invention is to provide a rolling bearing assembly that can be installed in a chassis wall with fewer manufacturing operations than with prior art rolling bearing assemblies and without the stringent tolerance controls required for bolt or rivet mounting processes of the past.

Another object of the invention is to provide a press-alignable non-clinching bearing assembly that can be installed in thicker plastic as well as thicker metal chassis walls.

Still another object of the invention is to provide a press-alignable bearing assembly that can easily be removed if necessary and replaced with a fresh bearing assembly.

These and other objects, features, and advantages of the invention will become more apparent upon review of the detailed description set forth below when taken in conjunction with the accompanying drawing figures, which are briefly described as follows.

DETAILED DESCRIPTION OF THE PREFERRED EMBODIMENTS

Figure 1:
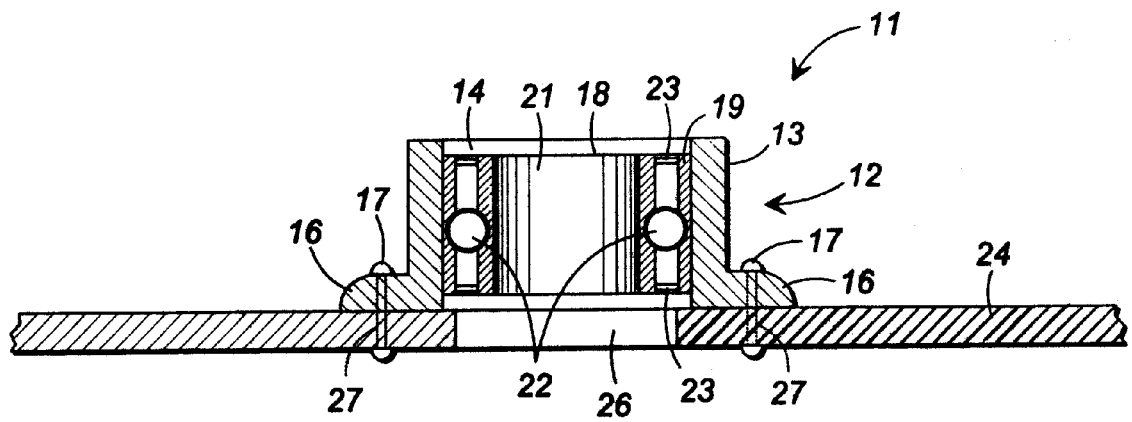
FIG. 1 is a sectional view illustrating a common prior art rolling bearing assembly mounted to a surface with rivets extending through mounting dogs.

Referring now in more detail to the drawings, in which like numerals refer to like parts throughout the several views, FIG. 1 illustrates a typical prior art rolling bearing assembly mountable to a relatively thin sheet metal plate. The prior art assembly 11 comprises a metal collar 12 having a substantially cylindrical outer wall 13 and a substantially cylindrical inner wall 14. A pair of tabs or mounting dogs 16 project from the base of the collar and are bored to accept appropriate fasteners such as bolts or rivets 17.

A rolling bearing 18, which, in FIG. 1 is a ball bearing, is press fit into the collar 12 so that it is securely held therein. The ball bearing illustrated in FIG. 1 has an annular outer shell 19, an annular inner shell 21 and an array of metal balls 22 captured between the shells. Seals 23 are often provided on such bearings for keeping dust and dirt out of the bearing and for sealing in lubricants that may be provided in the bearing. The rolling bearing 18 can be mounted in the collar 12 in a variety of ways such as, for example, press fitting, thermal fitting, or, in some cases, with retaining rings that allow the bearing to be removed and replaced.

The rolling bearing assembly 12 of the prior art is mountable to a metal chassis wall 24, which has been provided with an opening 26 for accommodating a shaft disposed in the rolling bearing 18. Preferably, the opening 26 is larger than the shaft of the bearing to provide appropriate clearance therefor. An array of mounting holes 27 are carefully and accurately bored or punched in the wall 24 for receiving the fasteners 17 to mount the rolling bearing assembly 12 to the wall 24. As mentioned above, the process of drilling or punching the holes 27 must be performed accurately to provide holes in precisely the proper positions so that the assembly 12 is properly aligned on the wall 24. Further, the mounting process itself is time consuming and requires that the assembly 12 be positioned and that two, four, or more fasteners 17 be manually installed and tightened to mount the assembly 12 to the wall 24. Thus, the process of preparing the wall 24 to receive the prior art assembly 12 and the continued process of mounting the assembly 12 to the wall 24 is a multi-step operation requiring substantial time and resources in the manufacturing process.

Figure 2:
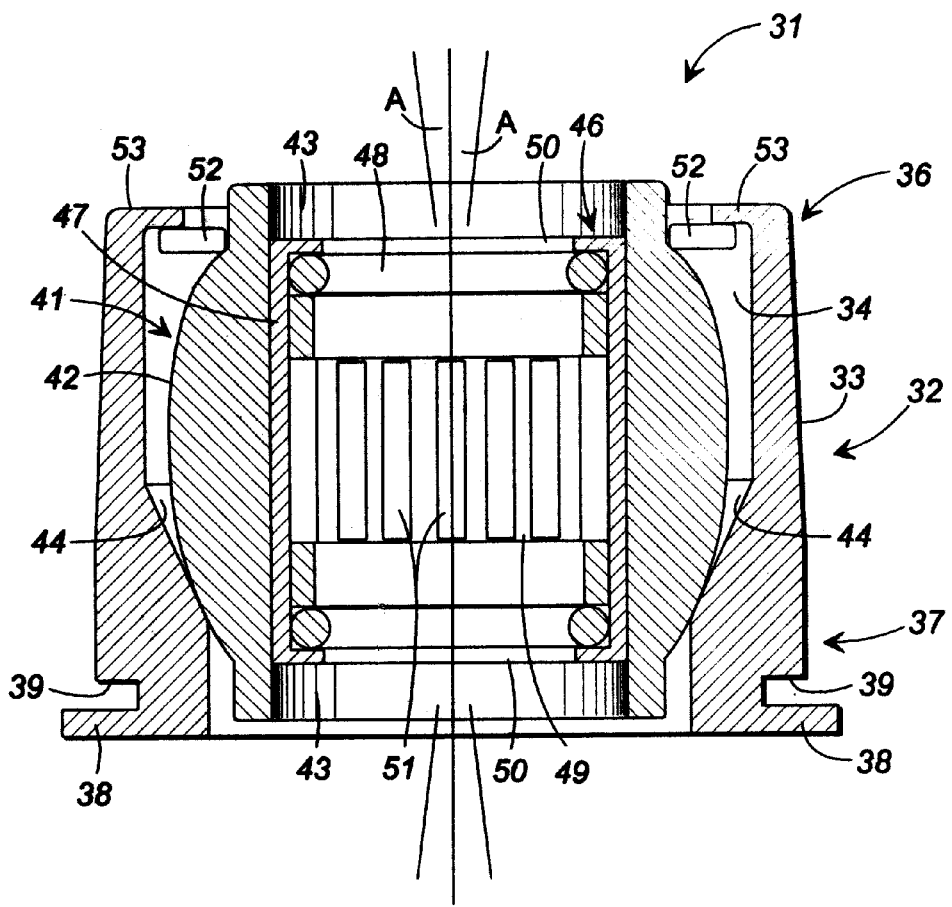
FIG. 2 is a sectional view of a self-clinching rolling bearing assembly that embodies principles of the present invention in one preferred form.
Figure 4:
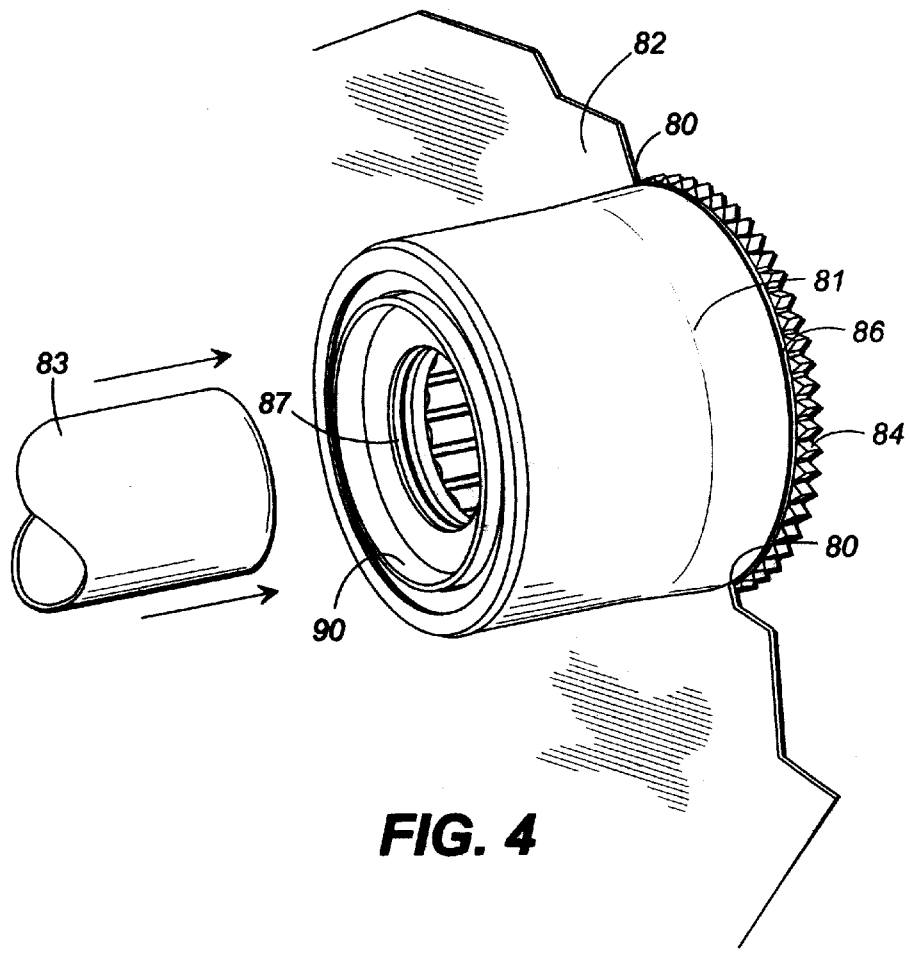
FIG. 4 is a perspective partially sectioned view of a rolling bearing assembly of the present invention shown mounted in a sheet of metal and receiving a shaft to be rotatably supported by the bearing of the assembly.

FIG. 2 is a side elevational sectional view of a self-clinching rolling bearing assembly that embodies principles of the present invention in one preferred form. The rolling bearing assembly 31 comprises a metal retainer 32 that is formed of a material, such as stainless steel, that is harder than the sheet metal material into which the assembly is to be pressed. The retainer 32 can be formed through a variety of processes such as, for example, turning, molding, or through powdered metal techniques. The retainer 32 is generally cylindrical in shape having a distal end 36, a proximal end 37, an outer wall 33, and an inner wall 34. A radially projecting generally annular head 38 is formed at the extreme proximal end of the retainer 32 and projects outwardly therefrom a predetermined distance. The function of the head 38 is to abut the metal around the perimeter of an opening through which the assembly is pressed when the assembly is completely installed in the opening. As best seen in FIG. 4, the head 38 is provided with a serrated peripheral edge 84, which anchors the assembly in place and prevents it from rotating when it is installed in a metal sheet. An undercut annular recess 39 is formed in the proximal end 37 of the retainer 32 at the base of the head 38 for purposes described in more detail below.

The outer surface 33 of the retainer 32 is tapered along at least a portion of its length to provide a distal end 36 having an outer diameter that is less than the diameter of the opening into which the retainer is to be pressed. The proximal end 37 of the outer surface 33 has a diameter that preferably is slightly larger than the diameter of the opening and, in any event, is no less than such diameter. With this configuration, it will be understood that as the retainer 32 is pressed into an opening formed in a sheet of metal, the metal in the region surrounding the opening is stretched or expanded slightly as the proximal end portion 37 of the retainer 32 slides through the opening.

Figure 3:
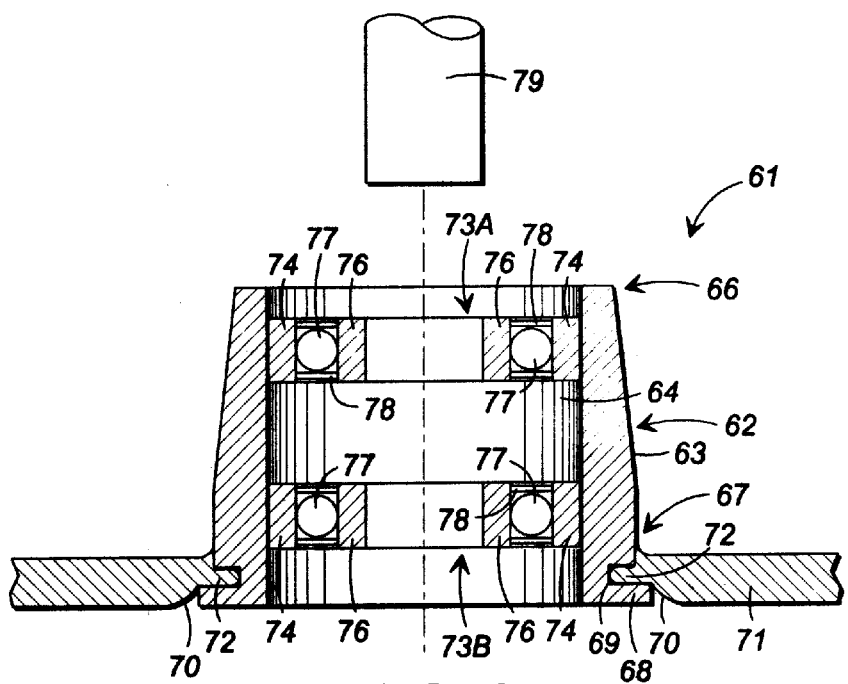
FIG. 3 is a sectional view of a self-clinching rolling bearing assembly that embodies principles of the present invention in an alternate form.

When the retainer 32 is fully inserted into the opening with its head 38 abutting the metal sheet around the perimeter of the opening, the slightly expanded metal of the sheet contracts and flows at least partially into the undercut annular recess 39 at the foot of the head 38 (see FIG. 3). This functions to secure the retainer 32 firmly in place within the opening and to hold the head 38 tightly against the metal surrounding the opening in the sheet. The serrated peripheral edge of the head 38 grips the sheet to prevent rotation of the retainer 32 in the opening. Thus, it can be seen that the retainer 32 is press fittable and self-clinching in an opening formed in a relatively thin sheet of metal and the installation process requires only one pressing step.

A bearing sleeve 41 is disposed within the retainer 32. The bearing sleeve 41 has an outer surface 42 and a substantially cylindrical inner surface 43. The outer surface 42 of the bearing sleeve 41 is formed with a substantially spherical or at least partially spherical bulge that projects outwardly along at least a portion of the length of the sleeve. The inner surface 34 of the retainer 32 is formed with a tapered seat 41 that is configured and positioned such that the spherical bulge of the bearing sleeve rests against the seat within the retainer 32 as shown. With this configuration, it will be seen that the bearing sleeve 41 is free to rock back and forth on the tapered seat 44 through a predetermined angle A with respect to the central axis of the retainer 32. This rocking or swiveling action of the bearing sleeve 41 provides self-aligning characteristics as described in more detail below.

An annular washer 52, which can be made of a suitable plastic material, surrounds the upper end portion of the bearing sleeve 41 and partially spans the space between the bearing sleeve and the distal end portion 36 of the retainer 32. Preferably, the washer 52 also rests against the top of the spherical bulge formed in the bearing sleeve. The extreme end portion 52 of the retainer 32 is crimped or otherwise bent over to capture the washer 52 and to hold it firmly in place between the bearing sleeve 41 and the retainer 32. The bearing sleeve 41 is thus captured between the tapered seat 44 and the washer 52 and is held firmly and securely in place thereby. However, the bearing sleeve 41 is still free to rock within the retainer 32 as necessary to align itself with a shaft inserted through the assembly.

A rolling bearing assembly 46 is mounted in the bearing sleeve 41. In the illustrated embodiment, the rolling bearing assembly 46 comprises a roller bearing having an outer casing 47 with crimped ends 50. Captured between the crimped ends 50 of the roller bearing assembly are a pair of flexible seals 48 and a roller retainer 49. The roller retainer 49 is configured to receive and hold a set of cylindrical rollers 51 loosely in place while, at the same time, allowing the rollers 51 to roll freely around the inside surface of the outer casing 47 of the bearing. Thus, when a shaft is inserted through the bearing, it is supported on the rollers 51 and, when the shaft is rotated, the rollers roll between the outer casing 47 of the bearing and the shaft to provide low friction rotatable support for the shaft.

Rolling bearing assemblies such as the roller bearing illustrated in FIG. 2 are common and known in the art. While a roller bearing has been illustrated in the preferred embodiment, it will be understood that a wide variety of bearing types might be mounted in the bearing sleeve 41. However, it has been discovered that rolling bearings of the type illustrated provide an advantage in that they exhibit a minimum outside diameter for a given inside diameter of the bearing. Nevertheless, the invention should not be construed to be limited to any type or configuration of rolling bearing and the roller bearing assembly illustrated in FIG. 2 is shown as only illustrative and as a preferred embodiment.

The bearing sleeve 41 can be made from a variety of materials such as steel, aluminum, bronze, plastic, or the like. However, it is preferable that the sleeve be formed of a material that will ride relatively easily on the tapered seat 44 of the retainer 32 without ceasing or otherwise unduly wearing. In this regard, it has been found that bronze as a material for the bearing sleeve functions well. Further, the rolling bearing assembly 46 preferably is mounted in the bearing sleeve 41 by a pressing operation wherein the bearing assembly is securely held in place by an interference fit between its outer casing 47 of the bearing and the inner surface 43 of the bearing sleeve.

It will thus be seen that the assembly 31 comprises a press fittable self-clinching rolling bearing assembly that can be installed easily and quickly with a single pressing operation in an opening formed in a relatively thin sheet of metal. In this respect, the assembly 31 provides many of the advantages of prior art self-clinching bushing assemblies. However, the rolling bearing assembly 46 extends substantially the usefulness of the assembly 31 over the prior art because the rolling bearing accommodates much higher rotation rates of a shaft than a bushing and supports much higher lateral loads than a bushing. Accordingly, with the present invention, a self-clinching rolling bearing assembly is provided that can be used in many situations where prior art bushing assemblies are not applicable.

FIG. 3 illustrates an alternate embodiment of the present invention wherein the rolling bearings are fixed within the retainer itself rather than being installed in a rocking bearing sleeve. The rolling bearing assembly 61 of this embodiment comprises a generally cylindrical retainer 62 having a distal end 66, a proximal end 67, an outer surface 63, and an inner surface 64. As with the embodiment of FIG. 1, the outer surface 63 is tapered along at last a portion of its length to define a distal end 66 having an outer diameter that is less than the diameter of an opening into which the assembly is to be pressed. The outer diameter of the retainer 62 at its proximal end 67 preferably is slightly larger than the diameter of the opening. A radially projecting annular head 68 is provided at the extreme proximal end of the retainer and an undercut annular groove 69 is formed at the base of the head.

The retainer 62 in FIG. 3 is illustrated as it appears when pressed into an opening formed in a relatively thin sheet of metal 71. As the retainer 62 is pressed into the opening, the metal around the perimeter of the opening is expanded or stretched slightly and, when the retainer 62 is fully pressed into place, this stretched material contracts and flows at least partially into the annular groove 69 as illustrated at 72. Further, the pressing process itself forms a slight indentation 70 in the surface of the sheet metal and this indentation accommodates the head 68. In this way, the head 68 of the retainer 62 becomes substantially flush with the surface of the sheet metal 71 when the assembly is pressed into place. Accordingly, the assembly 61 is press fittable and self-clinching in an opening formed in a relatively thin sheet of metal 71.

In contrast to the embodiment of FIG. 2, the inside surface 64 of the retainer 62 in FIG. 3 is substantially cylindrical in shape and is not formed with a tapered seat. A rolling bearing assembly 73, which in the embodiment of FIG. 3 is illustrated as comprising a pair of ball bearings 73A and 73B, is press fit into the retainer 62 and held securely therein by an interference fit between the bearings and the inner surface 64 of the retainer 62. The pair of ball bearings illustrated in FIG. 3 are presented to emphasize the flexibility of the present invention and to show that it can easily be supplied with a wide variety of rolling bearings. For example, roller bearings have been illustrated in FIG. 2 and ball bearings have been illustrated in FIG. 3. In addition, the invention could be supplied with other types of rolling bearings such as needle bearings where longitudinal loads are to be supported, clutch bearings that allow rotation only in one direction, or any other type of rolling bearing that can be installed in the retainer 62. In this regard, the configurations of the rolling bearings shown in FIGS. 2 and 3 should not be considered to be a limitation upon the present invention.

The ball bearings illustrated in FIG. 3 each has an outer bearing shell 74 and an inner bearing shell 76. A set of hardened metal balls 77 are captured between the shells 74 and 76 and seals 78 can be provided if desired to keep dirt out of the bearings. The inner bearing shell 76 is sized to receive and support a shaft 79 that is to be rotatably supported by the assembly 61. As with the roller bearings of FIG. 2, the ball bearings of FIG. 3 accommodate much higher rotation rates and much higher lateral loads than the self-clinching bushings available in the past.

While the inside surface 64 of the retainer 62 is cylindrical throughout its entire length in FIG. 3, it should be understood that the inner surface 64 might be formed with a variety of configurations for supporting various types of bearings. For example, where a bearing is to be pressed directly into the retainer 62 as shown in FIG. 3, the inner surface 64 could be formed with an annular shoulder against which the bearing rests for aligning the bearing properly within the retainer 62. These and other configurations of the inner surface 64 might well be provided within the scope of the present invention.

FIG. 4 is a perspective partially sectioned view of the embodiment of FIG. 2 of the present invention illustrating its appearance when installed in an opening formed in a relatively thin sheet of metal 82. The rolling bearing assembly 81 is seen to be press fit and clinched within an opening 80 formed in the sheet metal 82 as described above. The serrated peripheral edge 84 of the head of the retainer securely grips the metal around the periphery of the opening to prevent any tendency of the assembly 81 to rotate within the opening. A roller bearing 87 is shown mounted in its bearing sleeve 90, which, in turn, is mounted within the retainer for limited rocking motion therein as described above. In use, a pair of retainer assemblies 81 generally are mounted in opposed parallel walls of a metal chassis. A drive shaft or other shaft 83 is then inserted through the opposed assemblies and is supported by the rolling bearings extending between the walls of the chassis. The shaft 83 can then be rotated at high rates of rotation and can support relatively high lateral loads as it rotates within the bearing assemblies in which it is mounted.

Figure 5:
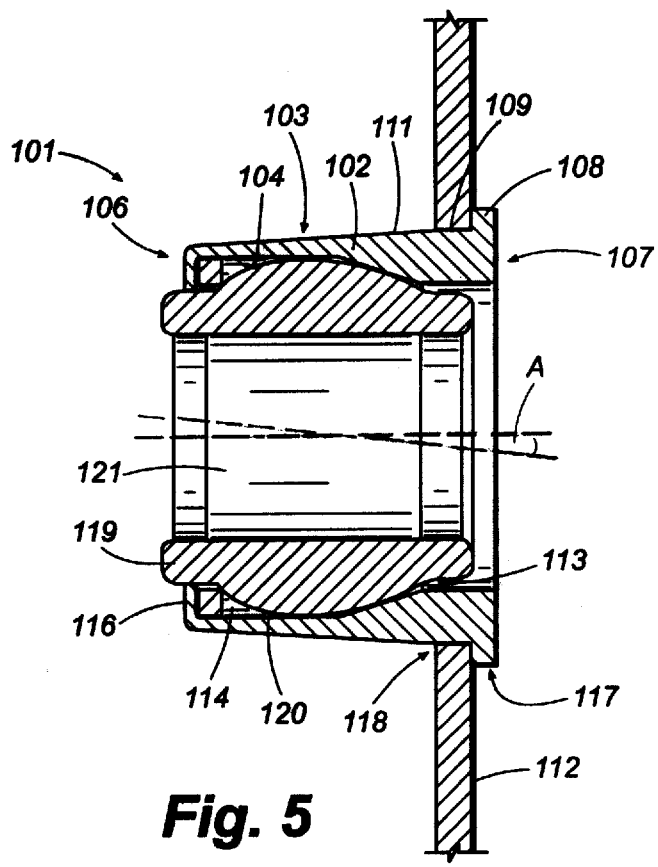
FIG. 5 is a sectional view of an alternate embodiment of this invention in the form of a press-alignable removable self-aligning bearing assembly.
Figure 6:
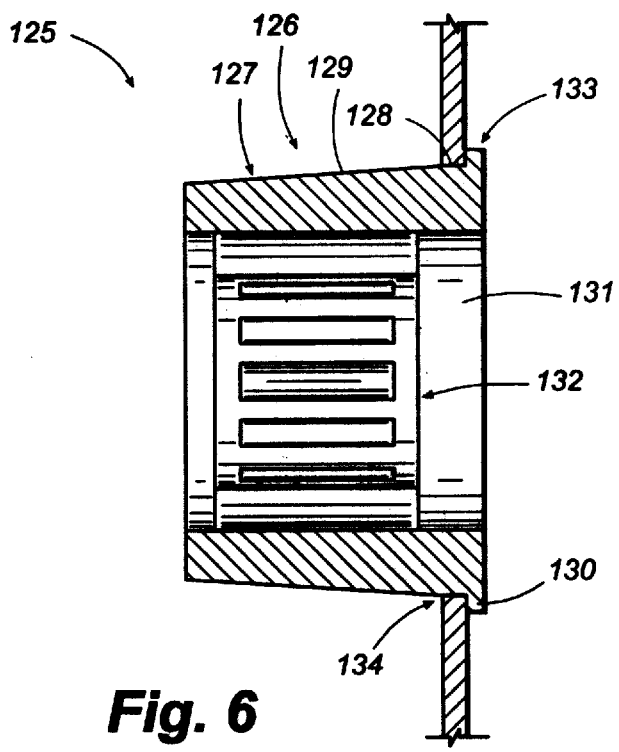
FIG. 6 is a sectional view of a variation of the embodiment of FIG. 5 in the form of a press-alignable removable fixed bearing assembly.

FIGS. 5 and 6 illustrate the present invention in the form of yet another alternate embodiment wherein the bearing assembly does not clinch in a chassis wall but instead presses in and is held with an interference fit so that it can be readily removed for replacement when necessary. The bearing assembly 101 comprises a generally cylindrical retainer 102 having an outer surface 103, an inner surface 104, a distal end 106, and a proximal end 107. The proximal end 107 is formed with a radially projecting flange or head 108 that, unlike prior embodiments, is not serrated or knurled but rather has a smooth peripheral edge. The outer surface 103 of the retainer 102 is formed with a cylindrical portion 109 and a tapered portion 111. The cylindrical portion has a length that is at least the same as and preferably greater than the thickness of a sheet of material 112 into which the bearing assembly is to be pressed.

The tapered portion 111 of the outer surface 103 terminates at and forms a distal end of the retainer that is smaller than an opening in which the bearing assembly is to be pressed. The cylindrical portion 109 of the retainer preferably is slightly larger in diameter than the diameter of the opening to form a tight interference or friction fit when the bearing assembly is pressed into the opening.

Unlike the prior embodiments, the retainer of FIGS. 5 and 6 does not include an undercut annular groove at the base of the head 108. Thus, this embodiment does not "lock" or clinch itself into place within an opening as does previously discussed embodiments. Instead, the interference fit formed when the retainer is pressed into an opening holds the bearing assembly firmly in place but, unlike other embodiments, allows the bearing to be pressed back out of the opening if needed in order to replace or repair the assembly.

The pressed-in interference fit of this embodiment makes it suitable for use in thicker walls and in chassis walls made from a wide variety of material other than metal, such as, for example, plastic. Further, and also unlike previously discussed embodiments, the head 108 of this embodiment is not pressed or smashed into the surface of the sheet material but instead simply abuts the surface around the periphery of the opening and stands proud as illustrated at 117 in FIG. 5. This further enhances the broad range of uses of the invention and tends to provide better alignment of the bearing assembly in materials other than metal.

The embodiment of FIG. 5 includes a self-aligning bearing sleeve 119 similar to that in the embodiment of FIG. 2. The bearing sleeve 199 has a rounded or barrel-shaped outer surface 120 that is pivotably captured between a tapered seat 113 formed by the inner wall of the retainer 102 and an annular washer 114. The annular washer 114 is held in place by crimping the distal end 106 of the retainer over the washer, as indicated at 116 in FIG. 5. A bearing 121 is pressed into the bearing sleeve 119 for receiving and rotatably supporting a shaft as described above. The bearing 121 can be any conventional type of bearing, including a plastic or metal bushing or a rolling bearing. With this configuration, the bearing sleeve and bearing can pivot or rock through an angle A relative to the axis of the bearing assembly. The bearing is therefore self-aligning to accommodate slight variations in alignment of a pair of spaced opposed bearing assemblies when a shaft is inserted through the bearings.

FIG. 6 illustrates a variation of the embodiment of FIG. 5 wherein a fixed bearing 132 is pressed directly into a retainer 126. The retainer 126 has an outer surface 127 with a tapered portion 129 and a cylindrical portion 128. An annular rim or head 130 projects radially outwardly from the proximal end of the retainer and preferably has a smooth non-serrated outer peripheral edge. The inner surface 131 of the retainer is cylindrical and is sized to receive a bearing 132, which can be a bushing or a rolling bearing pressed into the retainer. The bearing 132 is thus fixed in the retainer and is not pivotable as is the bearing of FIG. 5.

The cylindrical portion 128 of the outer surface 127 of retainer 126 has a diameter slightly larger than the diameter of an opening in which the bearing assembly is to be pressed and preferably has a length greater than the thickness of the material into which the bearing assembly is to be installed. Thus, the bearing assembly 125 of FIG. 6 can be pressed into an opening formed in a metal or plastic chassis wall and is held in place with an interference fit, as indicated at 134. The head is not pressed into the surface of the wall, but rather stands proud as indicated at 133 in FIG. 6. This is important when pressing the bearing assembly into a material such as plastic because, unlike in metal, if the head were pressed into plastic material, the uniformity of its depth around the entire periphery would not be easily controlled, resulting in inherent misalignment. With the head abutting the surface of the plastic instead, alignment with the surface of the plastic is assured. The embodiments of FIGS. 5 and 6 can therefore be said to be press-alignable in an appropriate opening formed in a wall of material.

It will be seen that the variation of FIG. 6 provides a fixed bearing assembly that is more economical than the embodiment of FIG. 5 and that is suitable for a variety of uses where self-alignment is not a requirement. Since the bearing assembly is held in place with an interference fit, it can easily be pressed out and replaced with a new bearing assembly if necessary.

Figure 7:
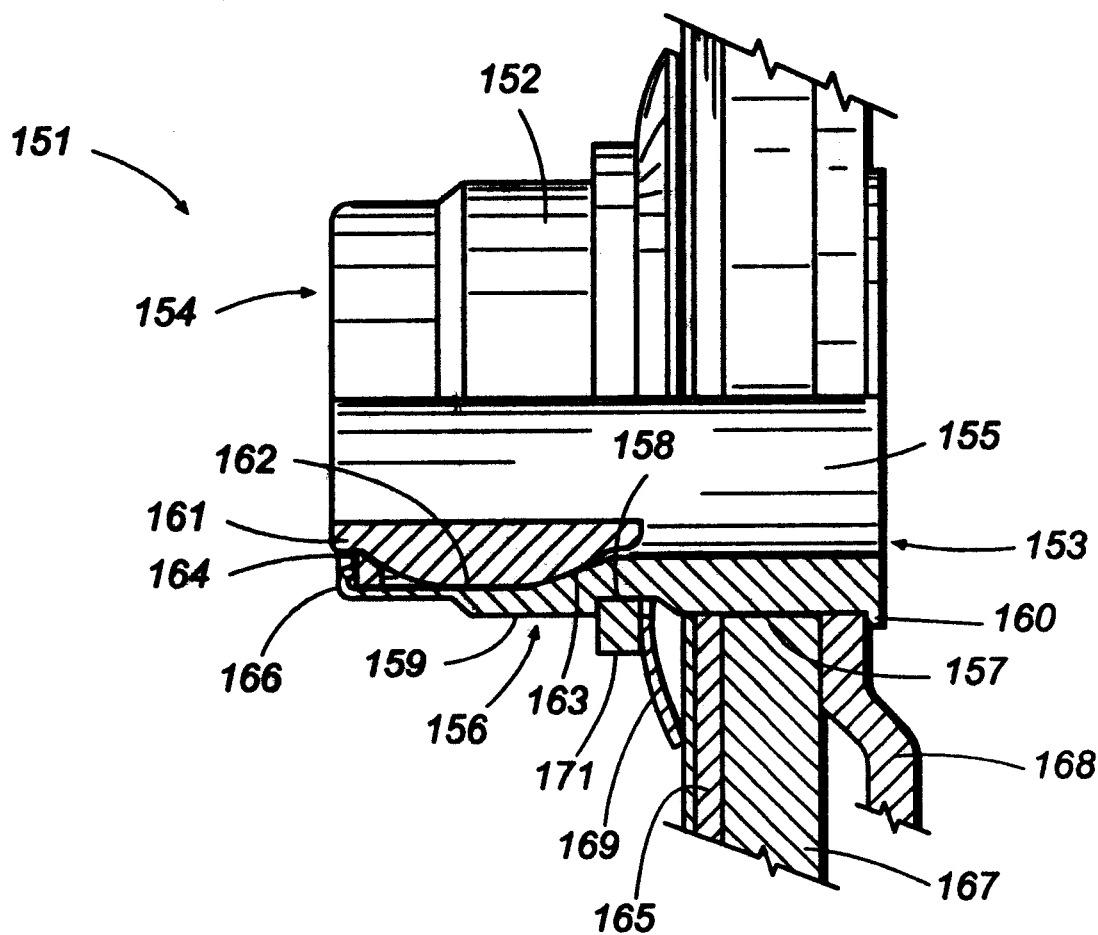
FIG. 7 is a partially sectional view of yet another variation of the embodiment of FIG. 5 wherein the retainer body of the bearing assembly also serves as a fastener for other components.

FIG. 7 illustrates in a partially sectioned view a press alignable bearing assembly that embodies principles of the invention in yet another form. Specifically, the embodiment of FIG. 7 is designed to serve the dual function of being press fitable and self aligning in a chassis wall and at the same time to function as a fastener for ancillary components to be attached to the chassis at the location of the bearing. The bearing assembly 151 is similar to prior embodiments in some ways and comprises a retainer 152 having a proximal end 153, a distal end 154, an inside surface 155, and an outside surface 156. The outside surface 156 has a first generally cylindrical portion 157 adjacent a radially projecting annular head 160 and a second generally cylindrical portion 159. An annular groove 150 is formed around the retainer and separates the first cylindrical portion from the second cylindrical portion. Preferably, although not necessarily, the second cylindrical portion 159 is smaller in diameter than the first cylindrical portion 157, which itself has a diameter the same as or just slightly larger than that of an opening in a chassis wall into which the bearing assembly is to be pressed.

The inside surface 155 of the retainer 152 is formed with a tapered seat 163 against which rests the barrel-shaped outside surface 162 of a bearing sleeve 161. The bearing sleeve 161 is captured and held in the retainer by means of an annular retaining washer 164 secured by a crimped distal rim 166. In this way, and as with prior embodiments, the bearing sleeve is free to swivel or rock slightly for automatic alignment with corresponding opposing sleeves.

The bearing assembly of FIG. 7 is shown pressed into an opening formed in a chassis wall 167, where it fits snuggly and with a friction fit to retain the bearing in place. This embodiment, however, also serves another purpose. Specifically, an ancillary component 168, which is also formed with an opening the same or similar size as the opening in the chassis wall 167, is captured between the chassis wall 167 and the head 160 to hold the ancillary component to the chassis. The ancillary component itself could be a wide variety of elements, either related to the bearing or not, and its specific nature is not relevant to the invention. Thus, this embodiment serves to fasten an ancillary component to the chassis in addition to be press alignable and removable for replacement.

In order to hold the bearing assembly and the ancillary component tightly to the chassis, a spring clip or spring washer 169 surrounds the outside surface 156 of the retainer in the vicinity of the annular groove 158. The spring clip 169 is held in place on the retainer 152 and is held tightly and securely against the chassis wall 167 by means of an annular retaining ring 171, which is disposed in the annular groove 158. In practice, the annular retaining ring 171 may be a split ring-type retainer, which spreads as it is pressed onto the retainer 152 and then snaps into the annular groove to secure the spring clip 169.

In use, the bearing assembly of FIG. 7 is pressed through openings formed in the chassis wall and in any ancillary components to be attached to the chassis wall with the bearing assembly. This may include components 168 on the outside of the chassis wall or components 165 on the inside of the chassis wall, or both. Once the bearing assembly is pressed through the wall and components, the spring clip 169 is slipped over the retainer body 152 and the annular retainer is pressed against the spring clip and snapped into the annular groove 158. This process actually compresses the spring clip 169 tightly against the chassis wall to hold the bearing assembly and the ancillary component tightly to the chassis wall. If the bearing assembly should need to be replaced, the annular retaining ring and spring clip are simply removed, the bearing assembly pressed out of the openings, and a new bearing assembly pressed in and attached.

The invention has been described herein in terms of preferred embodiments and methodologies. It will be obvious to those of skill in the art, however, that various additions, deletions, and modifications might well be made to the illustrated embodiments within the scope of the invention. For example, as discussed above, while roller bearings and ball bearings have been illustrated, the invention is equally applicable to virtually any type of rolling bearing assembly that can be mounted within the self-clinching or the non-self-clinching interference fit retainer of the invention. This includes special purpose bearings such as, for example, linear ball bushings, needle bearings, clutch bearings, and others. In addition, while a pair of ball bearings have been illustrated in FIG. 3 to illustrate the flexibility of the invention, a single ball bearing could be used just as easily. Further, the various components of the assembly can be manufactured from a variety of materials as long as the retainer is made of a material that is harder than the material of the sheet into which it is to be pressed. These and other additions, deletions, and modifications might well be made to the illustrated embodiments without departing from the spirit and scope of the invention as set forth in the claims.

What is claimed is:

1. A press-alignable bearing assembly for being pressed into and mounted within a substantially circular opening of a predetermined diameter formed in a sheet of material, said bearing assembly comprising:

a retainer formed with a generally cylindrical body portion having a predetermined length, a longitudinal axis, an inner surface, an outer surface, a distal end portion, and a proximal end portion;

said outer surface of said retainer being tapered along at least a portion of its length to establish an outer diameter at said distal end portion of said body that is less than the predetermined diameter of the opening formed in the sheet material into which said bearing assembly is to be pressed;

said proximal end portion of said retainer having an outer diameter that is no less than the predetermined diameter of the opening formed in the sheet material to establish an interference fit between said proximal end portion of said retainer and the opening as said retainer is pressed into the opening;

a generally annular head terminating and projecting radially outwardly from said proximal end portion of said retainer for abutting the sheet material in a region surrounding the opening formed therein when said retainer is pressed into the opening;

a bearing having an axis;

a bearing sleeve having a longitudinal axis, an outer surface sized to be received in said retainer and a substantially cylindrical inner surface having a diameter that is predetermined to receive and secure said bearing with an interference fit when said bearing is pressed into said bearing sleeve; and means for mounting said bearing sleeve in said retainer for limited rocking movement of said bearing sleeve within said retainer to provide for self-alignment of a bearing mounted in said bearing sleeve when a shaft is inserted through said bearing.

2. A press-alignable bearing assembly as claimed in claim 1 and wherein said means for mounting said bearing sleeve in said retainer comprises a generally spherical bulge formed in said outer surface of said bearing sleeve, a tapered seat formed in said inner surface of said retainer, and means for securing said bearing sleeve within said retainer with a portion of its spherical bulge resting against said tapered seat.

3. A press-alignable bearing assembly as claimed in claim 2 and wherein said means for securing said bearing sleeve within said retainer comprises an annular retaining washer disposed in said distal end portion of said retainer with said washer at least partially spanning the space between said inner surface of said retainer and said bearing sleeve, said distal end of said retainer being crimped over an outer peripheral portion of said annular retaining washer to hold said washer and said bearing sleeve firmly in place within said retainer.

4. A press-alignable bearing assembly as claimed in claim 1 and wherein said bearing comprises a rolling bearing.

5. A press-alignable rolling bearing assembly as claimed in claim 1 and wherein said bearing comprises a bushing.

6. A press-alignable bearing assembly as claimed in claim 1 and wherein said annular head is formed with a smooth outer peripheral edge and is adapted to abut the wall in a region surrounding the opening therein to align said bearing assembly with the wall when said bearing assembly is pressed into the opening.

7. A press-alignable bearing assembly adapted to be pressed into an opening formed in a sheet of material, said bearing assembly comprising, in combination, a retainer having a generally cylindrical body portion with a distal end, a proximal end, an outer surface, and an inner surface, said outer surface of said retainer being contoured to be press fit into the opening formed in the sheet material and secured firmly in place within the opening by an interference fit between said retainer and said opening, and a bearing mounted in said retainer for rotatably receiving a shaft when said assembly is pressed into the opening in the sheet material, said retainer having a longitudinal axis and said assembly further comprising a bearing sleeve mounted in said retainer for limited rocking movement relative to said longitudinal axis of said retainer, said bearing sleeve having a generally cylindrical central bore and said bearing being secured within said central bore of said bearing sleeve.

8. The press-alignable bearing assembly of claim 7 and wherein said bearing comprises a rolling bearing.

9. The press-alignable bearing assembly of claim 7 and where said bearing comprises a bushing.

10. The press-alignable bearing assembly of claim 7 and wherein said bearing sleeve is formed with an outer surface having an outwardly projecting generally spherical bulge and wherein said inner surface of said retainer is formed with a seat against which a portion of said bulge rests and moves when said bearing sleeve is mounted in said retainer, said assembly further comprising means for securing said bearing sleeve in said retainer.

11. The press-alignable bearing assembly of claim 10 and wherein said means for securing said bearing sleeve in said retainer comprises an annular washer disposed in said distal end of said retainer spanning a space between said inner surface of said retainer and said bearing sleeve, said distal end of said retainer being at least partially crimped over said annular washer to hold said washer and said bearing sleeve in place within said retainer.

12. The press-alignable bearing assembly of claim 11 and wherein said spherical bulge is shaped and sized to ensure that said annular washer rests against said spherical bulge such that said spherical bulge is captured between said seat and said annular washer to hold said bearing sleeve in place within said retainer and to permit limited rocking movement of said bearing sleeve relative to said retainer.

13. In combination, a sheet of material having a hole formed therethrough, a bearing retainer pressed and held by an interference fit within said hole, a bearing mounted in said bearing retainer for rotatably receiving a shaft when said retainer is mounted in said hole, and an ancillary component having a hole formed therethrough, said bearing retainer extending through said hole in said sheet of material and through said hole in said ancillary component to hold said ancillary component to said sheet of material.

14. The combination of claim 13 and wherein said bearing retainer has a longitudinal axis and further comprising means for providing limited rocking movement of said bearing in said retainer relative to said longitudinal axis thereof.

15. The combination of claim 14 and wherein said means for providing limited rocking movement comprises a bearing sleeve mounted in said retainer for limited rocking movement relative to said longitudinal axis of said retainer, said bearing being securely mounted within said bearing sleeve.

16. The combination of claim 13 and further comprising a spring clip secured about said bearing retainer, said spring clip securing said bearing retainer and said ancillary component to said sheet of material.

17. The combination of claim 16 and wherein said bearing retainer is formed with an annular groove and further comprising a retaining ring in said annular groove securing said spring clip to said bearing retainer.

* * * * *